United States Patent [19]

Kodama et al.

[11] Patent Number: 4,640,257

[45] Date of Patent: Feb. 3, 1987

[54] ENGINE CONTROL WITH EXHAUST GAS RECIRCULATION

[75] Inventors: Katsuhiko Kodama, Oobu; Hisamitsu Yamazoe, Kariya, both of Japan

[73] Assignee: Nippondenso Co., Ltd., Kariya, Japan

[21] Appl. No.: 729,145

[22] Filed: Apr. 30, 1985

[30] Foreign Application Priority Data

May 1, 1984 [JP] Japan .................................. 59-88644
May 8, 1984 [JP] Japan .................................. 59-91424

[51] Int. Cl.$^4$ ............................................ F02M 25/06
[52] U.S. Cl. .................................... 123/571; 123/489; 364/431.06
[58] Field of Search ............... 123/480, 489, 568, 569, 123/571; 364/431.04, 431.05, 431.06

[56] References Cited

U.S. PATENT DOCUMENTS

| | | | |
|---|---|---|---|
| 4,304,210 | 12/1981 | Hayakawa | 123/571 |
| 4,399,791 | 8/1983 | Kobayashi et al. | 123/571 X |
| 4,448,178 | 5/1984 | Yamato et al. | 123/571 |
| 4,471,745 | 9/1984 | Yoshioka et al. | 123/571 |
| 4,534,334 | 8/1985 | Murakami et al. | 123/571 |
| 4,553,518 | 11/1985 | Takao et al. | 123/571 X |

FOREIGN PATENT DOCUMENTS

| | | |
|---|---|---|
| 0044760 | 3/1982 | Japan . |
| 0083641 | 5/1982 | Japan . |
| 0091341 | 5/1983 | Japan . |
| 0082057 | 5/1983 | Japan . |

Primary Examiner—Willis R. Wolfe, Jr.
Attorney, Agent, or Firm—Cushman, Darby & Cushman

[57] ABSTRACT

In engine control apparatus with exhaust gas recirculation control and air/fuel ratio feedback control, the amount of recirculated exhausted gasses is accurately detected so as to operate an internal combustion engine under an optimal operating condition all the time. To this end a correction factor derived from oxygen sensor output, which is used for air/fuel ratio control, is monitored to obtain a difference of a correction factor value resulted from engine operation with EGR and another correction factor value resulted from engine operation with EGR. This difference is obtained by forcibly interrupting EGR operation. Once the amount of recirculated exhaust is accurately estimated, the EGR control and/or air/fuel ratio control are performed with compensation for possible error due to secular change in EGR system.

12 Claims, 7 Drawing Figures

ENGINE CONTROL WITH EXHAUST GAS RECIRCULATION

BACKGROUND OF THE INVENTION

This invention relates generally to control of an internal combustion engine equipped with exhaust gas recirculation system, and more specifically to apparatus for controlling the amount of recirculated exhaust gasses and air/fuel ratio of an air/fuel mixture supplied to an internal combustion engine.

Exhaust gas recirculation, which is known as EGR, is used for reducing the concentration of nitrogen oxides (NOx) included in exhaust gasses from an internal combustion engine. Conventionally, to ensure the accuracy of the EGR control, a valve is controlled electronically in order to control the amount of recirculated exhaust gasses.

In such a conventional EGR system, the amount of recirculated exhaust gasses is estimated by detecting an opening degree of an EGR valve. When using such an EGR system for a long period of time, dirty particles, such as carbon and unburnt substances, are attached to the inner surfaces of the EGR valve and EGR passage. Therefore, the relationship between the opening degree of the EGR valve and the amount of recirculated gasses is disturbed raising a problem that the initial object of estimating the recirculation is not achieved. One approach for solving this problem is to measure the amount of recirculated gasses so as to control the same. One example of a conventional arrangement according to such approach is a technique of estimating the amount of EGR by ascertainining the amount of fresh air with an airflow meter being provided to an intake manifold so as to measure the amount of fresh air even during EGR operation. This technique is disclosed in Japanese patent provisional publication No. 57-44760. Another example is a technique of estimating the amount of fresh air using total intake amount of an internal combustion engine and a sensor provided to an EGR valve. This is disclosed in Japanese patent provisional publication No. 57-83641.

Such conventional techniques, however, only estimate the amount of fresh air or the amount of EGR by detecting one of them where their measuring system is provided centering around the intake pipe of the internal combustion engine. Therefore, true state of air-fuel mixing within the combustion chambers of the internal combustion engine cannot be detected. As a result, air/fuel ratio control carried out through computation of fuel injection amount for obtaining optimal air/fuel ratio is apt to suffer from errors. Furthermore, the above-mentioned first convetional technique requires an airflow meter which introduces resistance to airflow within the intake system. In addition, since the above-mentioned second conventional technique employs a sensor installed in the EGR valve, the sensor is apt to suffer from deterioration due to dirty particles in the exhaust gasses, while there arises a problem relating to maintenance of the sensor. For these reasons, conventional EGR systems are desired to be improved.

SUMMARY OF THE INVENTION

The present invention has been developed in order to remove the above-described drawbacks inherent to the conventional EGR systems.

It is, therefore, an object of the present invention to provide a new and useful apparatus for controlling EGR and air/fuel ratio for an internal combustion engine.

According to a feature of the present invention the amount of recirculated exhausted gasses is accurately detected so as to operate an internal combustion engine under an optimal operating condition all the time. To this end a correction factor derived from oxygen sensor output, which is used for air/fuel ratio control, is monitored so as to obtain a difference of a correction factor value resulted from engine operation with EGR and another correction factor value resulted from engine operation without EGR. This difference is obtained by forcibly interrupting EGR operation. Once the amount of recirculated exhaust is accurately estimated, the EGR control and/or air/fuel ratio control are performed with compensation for possible error due to secular change in EGR system.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
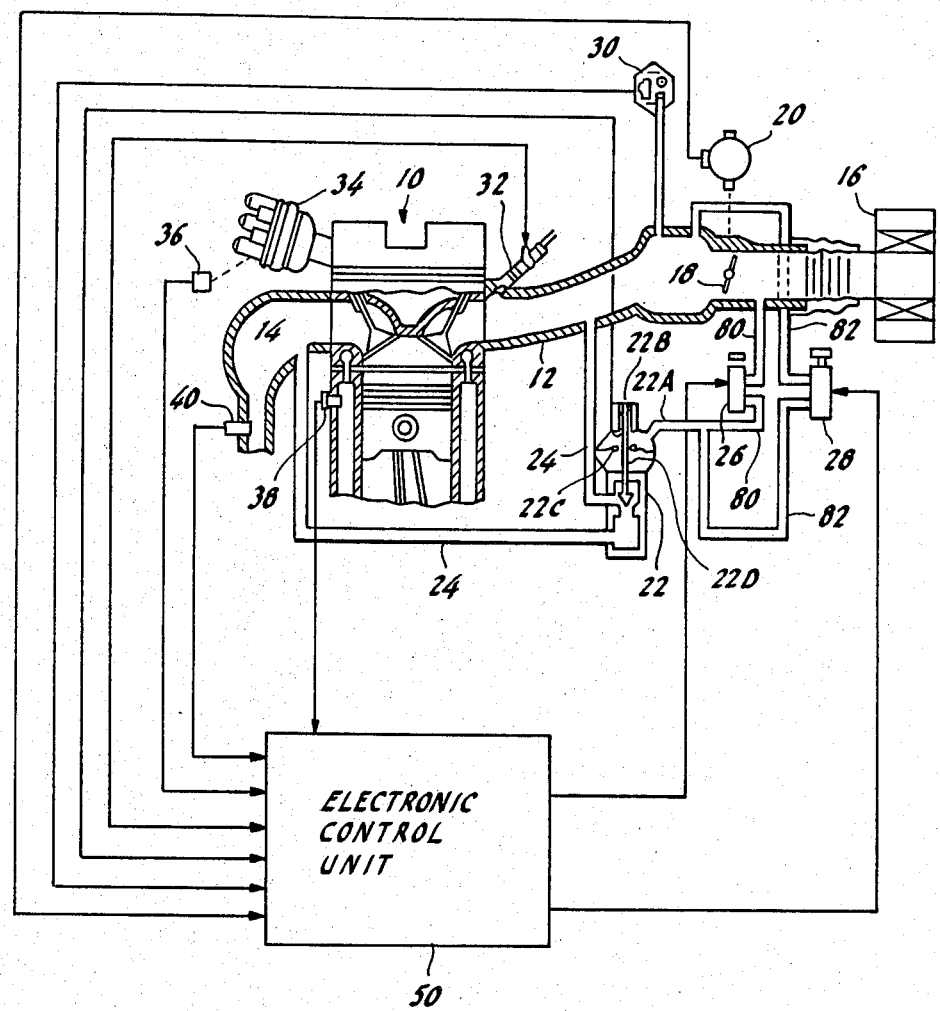
FIG. 1 is a schematic view of an internal combustion engine equipped with EGR system according to the present invention.

Referring now to FIG. 1, a schematic view of an internal combustion engine equipped with an EGR system according to the present invention is shown. An internal combustion engine 10 is equipped with an intake pipe 12 and an exhaust pipe 14, and the operating state of the engine 10 is detected by various sensors all the time. An electronic control unit 50 controls the internal combustion engine 10 using detection results from the various sensors as will be described in detail hereinlater.

The intake pipe 12 is provided for supplying the engine 10 with fresh air and recirculated exhausted gasses. To one end of the intake pipe 12 is attached an air filter 16 for cleaning intake air, and a throttle valve 18 is provided within the intake pipe 12 for contolling the intake fresh air quantity. The throttle valve 18 is associated with a throttle opening degree sensor 20 supplying the electronic control unit 50 with throttle opening degree information.

The exhaust gas recirculation from the exhaust pipe 14 to the intake pipe 12 is carried out via an EGR tube 24 in which an EGR control device 22 is provided. The EGR control device 22 comprises a control valve of the diaphragm type and is arranged such that a diaphragm 22C thereof drives a control valve 22D having a valve head against a force of cylindrical spring in accordance with pressure fed via a control conduit 22A so that the amount of exhaust gasses flowing through the EGR tube 24 is controlled. Thus the control valve 22D moves up and down in the drawing, where the reciprocal movement of the control valve 22D is detected by an EGR valve lift sensor 22B built in the EGR control device 22. The EGR valve lift sensor 22B is of the linear solenoid type, producing an output signal indicative of the position of the control valve 22D. The control conduit 22A communicates via two passages 80 and 82 with the intake pipe 12 at a portion upstream the throttle valve 18 and downstream the same. More specifically, the passage 80, which is referred to as an upstream passage, is provided between the control conduit 22A and the intake pipe 12 at a portion upstream the throttle valve with an electromagnetic valve 26, while the other passage 82, which is referred to as a downstream passage, is provided between the control conduit 22A and the intake pipe 12 at a portion downstream the throttle valve with an electromagnetic valve 28. The portion upstream the throttle valve 18 where the upstream passage 80 is connected exhibits a pressure substantially the same as atmospheric pressure, while the portion downstream the throttle valve 18 where the downstream passage 82 is connected exhibits a large negative pressure. With this arrangement, when the electromagnetic valve 26 is energized to open, pressure substantially equal to atmospheric pressue is sent via the passage 26 to the control conduit 22A. As a result, the diaphragm 22C is lowered by the force of the cylindrical spring causing the valve head of the control valve 22D to be in contact with an associated valve seat closing the EGR tube 24. Therefore, exhaust gasses are prevented from being recirculated. On the other hand, when the other electromagnetic valve 28 is energized to open, the diaphragm 22C moves upwardly against the force of the cylindrical spring. As a result, the valve head of the control valve 22D is lifted up, allowing exhaust gas recirculation via the EGR tube 24. An intake pressure sensor 30 is provided to detect the negative pressure at a portion downstream the throttle valve 18 to detect the pressure of fresh air and recirculated exhaust gasses within the intake pipe 12. An output signal from the intake pressure sensor 30 is fed to the electronic control unit 50. The reference 32 is a fuel injection valve through which fuel is sprayed into air taken into each cylinder of the engine 10. The reference 34 is a distributor of an ignition system of the engine 10, and the reference 36 is a rotational angle sensor associated with the distributor 34 for detecting the rotational speed of the engine crankshaft. The reference 38 is a coolant temperature sensor for detecting the temperature of engine coolant, and the reference 40 is an oxygen sensor for detecting the concentration of oxygen within the exhaust gasses in the exhaust pipe 14.

Figure 2:
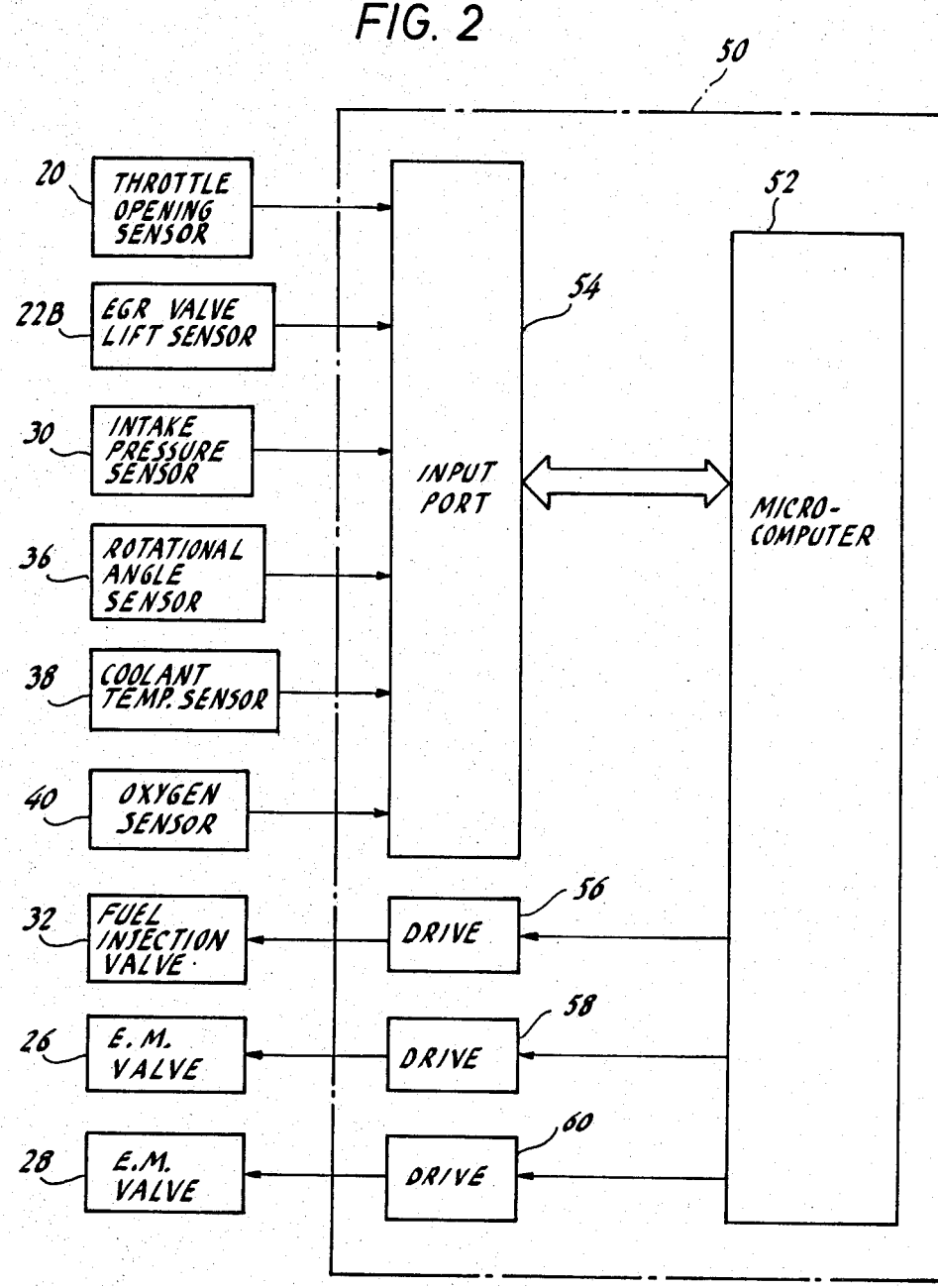
FIG. 2 is a block diagram of an electronic control unit used in the system of FIG. 1.

FIG. 2 is a block diagram of an electrical system associated with the EGR system according to the present invention. The electronic control unit 50 comprises a microcomputer 52, an input processing portion 54 including an A/D converter (not shown), and three drive circuits 56, 58 and 60. The input processing portion 54 also comprises buffers and waveform shaping circuits so as to receive various signals from the sensors 20, 22B, 30, 36, 38 and 40 and send corresponding information in the form of digital signals to the microcomputer 52 having memories (not shown). The microcomputer 52 is arranged to operate in accordance with a program stored in its memory using various information from the above-mentioned sensors so as to output instruction signals to the drive circuits 56, 58 and 60 by which the engine 10 is optimally controlled. More specifically, the fuel injection valve 32 is controlled to inject a desired amount of fuel to obtain a desired air/fuel ratio, while the electromagnetic valves 26 and 28 are respectively controlled to adjust the amount of recirculated exhaust gasses.

Figure 3:
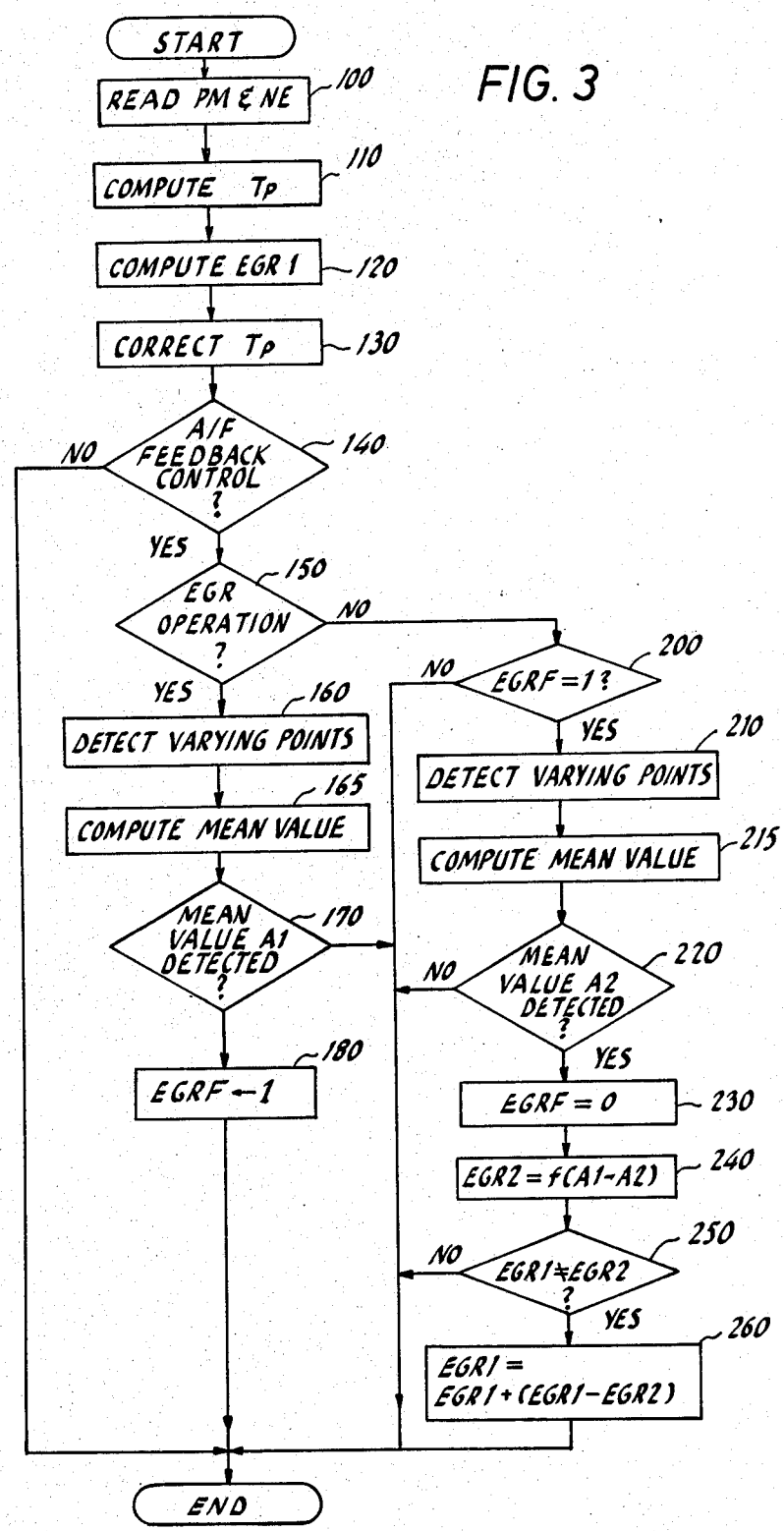
FIG. 3 is a flowchart showing an operational program of a microcomputer used in the electronic control unit of FIG. 2, which flowchart corresponds to a first embodiment of the present invention.

FIG. 3 is a flowchart showing an EGR control routine among various control routines. With this routine a valve-opening duration Tp of the fuel injection valve 32, which defines the amount of fuel supplied to the engine 10, and the amount of recirculated exhaust gasses are determined, while the amount of recirculated exhaust gasses is also corrected by this routine. Since this routine should be carried out frequently in accordance with the operating state of the engine, this routine is arranged to be executed at an interval corresponding to a given number of rotations of the engine 10 or at a given interval using a timer built in the microcomputer 52. The EGR control routine will be described in detail hereinafter.

When the EGR control routine of FIG. 3 is started, a step 100 is executed for reading outputs from the intake pipe pressure sensor 30 and from the rotational angle sensor 36 so as to detect intake pipe pressure PM and rotational speed NE of the engine 10.

In a subsequent step 110, an optimum amount of fuel to be supplied to the engine 10 is calculated in the form of a basic fuel injection duration Tp of the fuel injection valve 32 using the above two detected data PM and NE. To calculate Tp, actual computation using a formula including the data PM and NE may be operated or a two-dimensional map may be used, so that a corresponding $T_p$ is picked up from the map prepared in advance by storing data in the memory using PM and NE as two variables.

In a step 120, an amount of recirculated exhaust gasses, which is indicated at EGR1, is obtained using the above-mentioned two data PM and NE in the same manner as one of the above-mentioned two methods. This exhaust gas recirculation amount EGR1 is a value which corresponds to the output from the EGR valve lift sensor 22B, and represents an opening degree of the control valve 22D of the EGR control device 22 which is necessary for recirculating an optimum amount of exhaust gasses using two variables PM and NE.

In a step 130, the basic fuel injection duration Tp is corrected. There are various modes of engine operations during which engine output is maximized, starting characteristic is improved and so on, and therefore, engine operation cannot be simply determined by the intake pipe pressure PM and the engine speed NE during these periods. The basic fuel injection duration Tp only shows a basic value of fuel injection duration, and this basic value undergoes various corrections effected by the electronic control unit 50 using the results of detection from various sensors, so that the basic fuel injection duration Tp is corrected to a value most suitable for the present operating state of the engine 10.

The above-mentioned various corrections include a correction for increasing the amount of fuel to be injected into the engine 10 to increase output when it is detected such that the throttle valve 18 is largely opened by the throttle opening sensor 20, another correction for effecting air/fuel ratio feedback control to cause the engine to operate with a specific air/fuel ratio using a correction factor in accordance with an output signal from the oxygen sensor 40 under a given condition, and so on. The above-mentioned air/fuel ratio feedback control per se is well known in the art, and will be described briefly since it has a close relationship with the following processings.

In the air/fuel ratio feedback control, the engine 10 is operated with a specific mixing ratio between fuel and oxygen, which mixing ratio is selected through an overall decision relating to fuel consumption, engine output, harmful components emission or the like in a steady operating state after the engine 10 is warmed up. The air/fuel mixing ratio is detected using the oxygen sensor 40.

The oxygen sensor 40 is arranged to output a lean signal when air/fuel ratio is higher than a desired value, i.e. when amount of fuel is less, and a rich signal when air/fuel ratio is lower than the desired value, through continuous detection of oxygen concentration in exhaust gasses in the exhaust pipe 14. The electronic control unit 50 receiving the output from the oxygen sensor 40 performs feedback control so as to continually maintain the above-mentioned specific air/fuel ratio by lengthening the basic fuel injection duration Tp when the lean signal is present, and by shortening the same when the rich signal is present.

Figure 4:
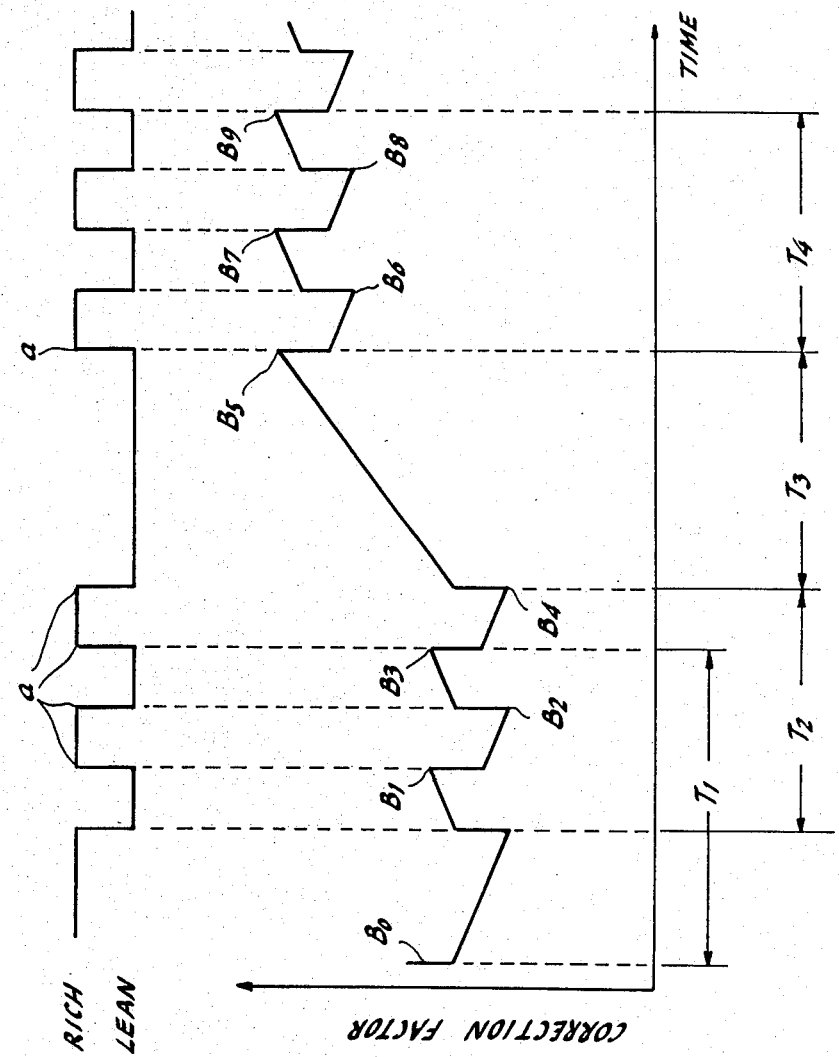
FIG. 4 is a diagram showing the relationship between oxygen sensor output and air/fuel ratio correction factor both used in the processing by the microcomputer of FIG. 2.

FIG. 4 shows the output from the oxygen sensor 40 (see upper waveform) and the variation of a correction factor (see lower waveform) used in the electronic control unit 50 which operates using the output from the oxygen sensor 40. As shown, the output from the oxygen sensor 40 is a binary signal assuming either a rich state level (high level) and a lean state level (low level), and the correction factor varies by a predetermined amount instantaneously in response to a rising or falling edge "a" of the waveform of the output from the oxygen sensor 40. More specifically, the correction factor stepwisely changes in the presence of rising or falling edge "a" and further changes linearly over a period between the rising and falling edges "a" so that the air/fuel ratio feedback control is performed proportionally and integrally.

The above-described operation is of normal fuel injection amount control, and further processing is carried out in this routine as will be described hereinafter.

In a step 140, it is checked whether the above mentioned air/fuel ratio feedback control is carried out in the various corrections executed in the step 130. The air/fuel ratio feedback control is carried out for obtaining most suitable air/fuel ratio for steady operating state of the engine 10. Therefore, air/fuel ratio feedback control is interrupted during engine-starting period and heavy-load operating period, and air/fuel ratio is controlled to be suitable for such transient periods respectively.

Processings following the step 140 are all carried out only when air/fuel ratio feedback control is being effected. In other words, a step 150 is executed when the determination in the step 140 resulted in YES. When the determination in the step 140 results in NO, namely when it is determined that the air/fuel ratio feedback control is being interrupted, the processing of the present routine is terminated.

The step 150 is provided for determining whether exhaust gas recirculation is being carried out or not. More specifically, exhaust gas recirculation is effected under limited conditions since it suffers from the decrease in engine output as described in the above. Therefore, it is determined whether exhaust gas recirculation is being carried out or not using the output from the EGR valve lift sensor 22B. When it is detected that exhaust gas recirculation is being carried out, a step 160 is then executed. On the other hand, a step 200 is executed when no recirculation is made.

In the step 160, which is executed only when the air/fuel ratio feedback control and EGR control are both being effected, the correction factor shown in FIG. 4 is monitored such that correction factor values Bn (wherein n is 0, 1, 2, 3 . . . ) are detected at points where the correction factor varies stepwisely. These points where stepwise changes are made will be referred to as varying points hereinafter. Then in a following step 165, the value Bn of the correction factor at each varying point is stored in a sequence so as to calculate a mean value thereof. In a following step 170, it is determined whether the number of values of Bn used for obtaining the mean value has reached a predetermined number such as 4. A mean value of such a predetermined number of values of Bn is expressed in terms of A1, and therefore, the step 170 is executed to see if such a mean value A1 is present or not. When such a mean value A1 is present, a step 180 is executed to set a flag EGRF to logic "1".

As the routine of FIG. 3 is executed a number of times so that the predetermined number, such as four, of the varying points Bn (for example from B1 to B4) are detected, then the determination in the step 170 turns to YES because the mean value A1 of the predetermined number of Bn is first obtained. To ensure the reliability of the mean value A1, the predetermined number of Bn are processed as follows. The difference between each measured value Bn and the mean value A1 is first computed and when one or more of the respective measured values of Bn, such as B0 to B3, are very far from the mean value A1, such deviated value or values are erased and it is regarded that the mean value A1 has not been calculated. In the example shown in FIG. 5, since the value of B0 is deviated from the mean value A1 for a period T1 by more than a predetermined value, B0 is erased. Then the operational flow does not proceed to a next step 180 but the above-mentioned steps from 100 to 170 are repeatedly executed until a subsequent varying point B4 is detected. From the above it will be understood that the step 180 is exeucted only when the internal combustion engine 10 continuously stably operates so that a predetermined number of varying points, such as B1 to B4 over the period T2 in FIG. 4, repeatedly appear with substantially the same varying pattern.

The step 180 is provided to set the flag EGRF to logic "1" for interrupting exhaust gas recirculation. More specifically, this flag EGRF is used to command EGR interruption for forcibly interrupting EGR. Since the step 180 is executed only when the engine 10 operates stably as described in the above, EGR interruption is made only during such stable engine operation. All the processings carried out after the determination in the step 150 that EGR is being carried out are terminated when the step 180 is completed.

Turning back to the step 150, when it is determined that EGR is not being carried out steps 200 to 260 are executed. In step 200, it is checked whether the flag EGRF equals logic "1" or not to see the reason why exhaust gas recirculation is not being carried out. More specifically, since EGR is not carried out by not only the above-mentioned forced interruption through the step 180 but also when it is determined that engine operating condition is not suitable for EGR in the step 120. Therefore, the flag EGRF is checked to see the reason of EGR interruption. When the flag EGRF equals "1", subsequent steps will be executed. On the other hand, the flag EGRF is not equal to 1, processing of the present routine is terminated.

In a step 210, values of varying points Bn are detected in the same manner as in the step 160. As the flag EGRF is set to logic "1" in the step 180 to interrupt EGR, then no exhaust is taken into the engine 10. In other words, intake air supplied to engine cylinders includes only fresh air. As a result, the concentration of oxygen of the intake air sucked by the engine suddenly increases resulting in a lean air/fuel mixture. Therefore, the air/fuel ratio correction factor drastically changes to increase the amount of fuel to be injected in a sequence as seen in a period T3 in FIG. 4. This change in the air/fuel ratio correction factor continues until a new equilibrium point is reached, and stable repetition of lean and rich states is performed around the new equilibrium point (see a period T4 in FIG. 4). Therefore, the values of the respective varying points B5 to B9 in the stable state are detected in the step 210.

Steps 215 and 220 are similar to the steps 165 and 170 so that a mean value A2 of the respective values of the varying points Bn, such as B5 to B9, in the stable state is calculated first and then it is determined if a predetermined number of the value of varying points Bn is reached or not.

A step 230 is executed to reset the flag EGRF to logic "0" for restarting exhaust gas recirculation since EGR interruption has been made to obtain the mean value A2. As a result, the engine 10 operates normally again.

In a following step 240, the amount of exhaust gas recirculation is computed using the difference between the above-mentioned two mean values A1 and A2, the former being a mean value of air/fuel ratio correction factor values resulted from EGR operation and the latter being a mean value of air/fuel ratio correction factor values resulted from non-EGR operation. The reason why the amount of recirculated exhaust gasses can be detected from the difference between the mean values A1 and A2 will be described. The EGR interruption by the step 180 is made during stable operation of the engine 10. Therefore, the difference between the mean values A1 and A2 of air/fuel ratio correction factor values Bn before and after the EGR interruption is caused from only the amount of exhaust gasses recirculated to the intake pipe 12 of the engine 10 through the EGR. For this reason the difference between the mean values A1 and A2 has a given relationship with the amount of recirculated exhaust gasses, and thus the latter can be computed once the difference between A1 and A2 is obtained.

The amount of recirculated exhaust gasses may be computed as a function of the difference between the mean values A1 and A2 so that the amount of recirculated exhaust gasses corresponds to a value EGR2 representing an output value of the EGR valve lift sensor 22B. Alternately, a map prestored in the memory of the microcomputer 52 may be used to pick up a value of EGR2 corresponding to the difference between the mean values A1 and A2. As a result, the amount of recirculated exhaust gasses which is actually carried out can be readily obtained as a value represented by the output value of the EGR valve lift sensor 22B.

Then in a following step 250, the value of EGR1 obtained in the step 120 and the value of EGR2 just obtained in the step 240 are compared to see if they are different from each other. When EGR2 equals EGR1, the processing of the present routine is terminated since an estimated value, i.e. EGR2, equals a target value, i.e. EGR1 and it can be regarded that no change has occurred in the EGR. This estimated value EGR2 will be referred to as accurately estimated value since EGR2 substantially equals the actualy amount of recirculated exhaust gasses. On the other hand, when EGR2 is different from EGR1, a next step 260 is executed for reducing the difference between the accurately estimated value and the target value.

In the step 260, the target value EGR1 obtained in the step 120 is corrected by adding thereto the difference between the target value EGR1 and the accurately estimated value EGR2. This corretion of the target value EGR1 is made for the following reason. While the target value EGR1 represents an output value of the EGR valve lift sensor 22B necessary for recirculating a desired amount of exhaust gasses, when effective inner diameter or cross-sectional area of the EGR passage 24 is reduced due to carbon or the like attached to the inner wall of the EGR pipe 24 or secular change of the control valve 22D of the EGR control device 22, actual amount of exhaust gasses recirculated is less than the desired amount. To compensate for such an error in the present invention, the value EGR2 is computed where the EGR2 represents the amount of actuation of the EGR control device 22 with actual amount of EGR being converted into the amount of actuation, and the difference between EGR1 and EGR2 is computed to detect the amount of reduction of recirculated exhaust gasses caused from the above-mentioned various factors, as a value converted into the amount of actuation of the EGR control device 22. Therefore, the amount of actuation of the EGR control device 22 necessary for obtaining initially desired exhaust gas recirculation can be obtained by renewing or updating the value of the target value EGR1 by adding the difference (EGR1−EGR2) thereto.

After the completion of the step 250, all the processings of the present routine is terminated.

As described in the above, with the operation of the program shown in FIG. 3 an accurate amount of exhaust to be recirculated can be obtained where the amount of correction, i.e. the difference between EGR1 and EGR2, corresponds to the amount of recirculated exhaust reduced due to secular change mainly. Therefore, this amount of correction does not change over a relatively long period of time, and therefore, once the correction amount is obtained it can be used for correcting the target value EGR1 for a relatively long period of time.

The EGR system according to the present invention provides the following advantages. First of all, the amount of recirculated exhaust gasses can be accurately computed even if a fuel injection system of speed density system is used as shown in FIG. 2. In addition, the computed value of recirculated exhaust gasses shows high reliability because it is obtained from the result of fuel combustion actually carried out in cylinders of the engine 10 without using intake pipe pressure or a sensor provided to a passage for EGR.

Furthermore, since the amount of recirculated exhaust gasses can be accurately detected and renewed, the initial purpose of EGR can be securely attained. Therefore, EGR control is satisfactorily effected to cause the engine 10 to operate with high efficiency.

Figure 5:
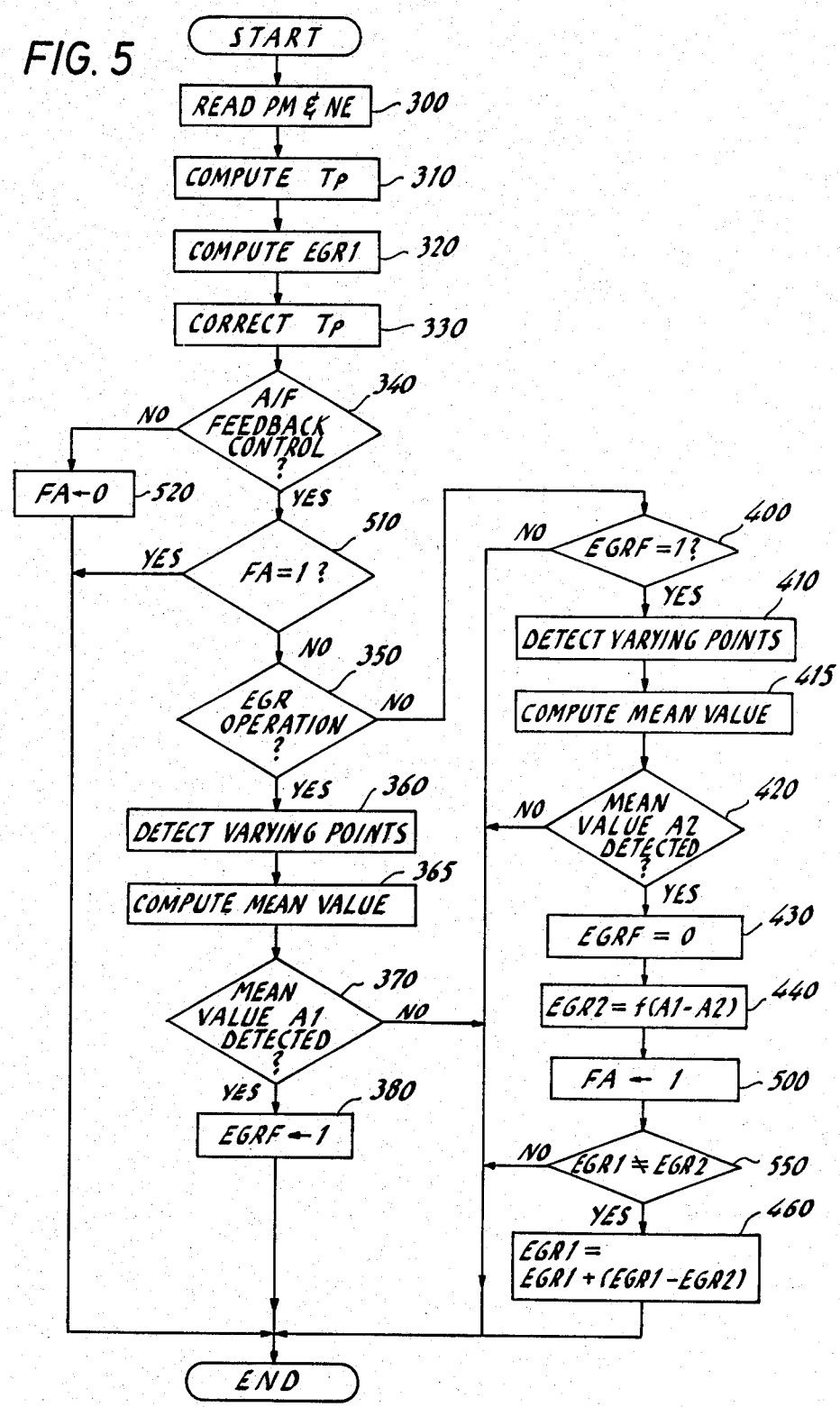
FIG. 5 is a flowchart showing another operational program of the microcomputer showing a second embodiment of the present invention.

Rererence is now made to FIG. 5 showing another embodiment of the present invention, which is a modification of the flowchart of FIG. 3. In the flowchart of FIG. 5, steps 300 to 380 respectively correspond to steps 100 to 180 of FIG. 3, while steps 400 to 460 also correspond to steps 200 to 260 to perform the same processing, and therefore description of these identical steps are omitted.

In the above, however, the computation of EGR1 exeucted in step 320 is performed using a map stored in the memory of the microcomputer 52, while the change of EGR1 in step 460 is carried out by uniformly changing all data of the map. The embodiment of FIG. 5 has new steps 500 to 520, and the following operation is carried out using a flag FA processed by these new steps.

As described in connection with the first embodiment of FIG. 3, the change or reduction in the effective cross-sectional area of the EGR passage 24 does not frequently occur, since the reduction is caused by secular change mainly. Therefore, the computation of EGR2 is not required to be effected frequently as in FIG. 3. In other words, EGR2 may be detected at a relatively long interval.

The above-mentioned flag FA is used to compute EGR2 only once immediately after air/fuel ratio control is started. More specifically, the flag FA is set to logic "1" in the step 500 after EGR2 has been computed in step 440. This flag FA is detected in the step 510 so that subsequent steps are executed only when the flag FA is of logic "1". In other words, when the flag FA is of logic "0", the processing of the routine of FIG. 5 is terminated.

Describing the operation of the routine of FIG. 5 from the beginning, the steps 300 to 330 are first exeucted for effecting normal air/fuel ratio control and EGR control as described in connection with the first embodiment of FIG. 3. In the step 340, it is checked whether conditions for air/fuel ratio control are satisfied or not to see if air/fuel ratio feedback control is being performed or not. If air/fuel ratio feedback control is being performed, the step 510 is executed to see whether the flag FA equals logic "1" or not. When FA="1", the processing of this routine is terminated. On the contrary, if FA="0", steps 350 et seq are exeucted.

The flag FA is reset to logic "0" in step 520 which is executed only when it is detected that air/fuel ratio feedback control is not being performed in the step 340. As will be understood from the above, EGR2 is obtained just once immediately after air/fuel ratio control is started, and the same value of EGR2 is used unless air/fuel ratio feedback control is interrupted. When air/fuel ratio feedback control is interrupted or terminated because the engine 10 is stopped or a heavy load is applied to the engine 10, then the flag FA is reset to logic "0" so that EGR2 will be computed immediately after the air/fuel ratio feedback control is restarted.

The above-described second embodiment is more advantageous than the first embodiment since EGR is not often forcibly interrupted.

Figure 6:
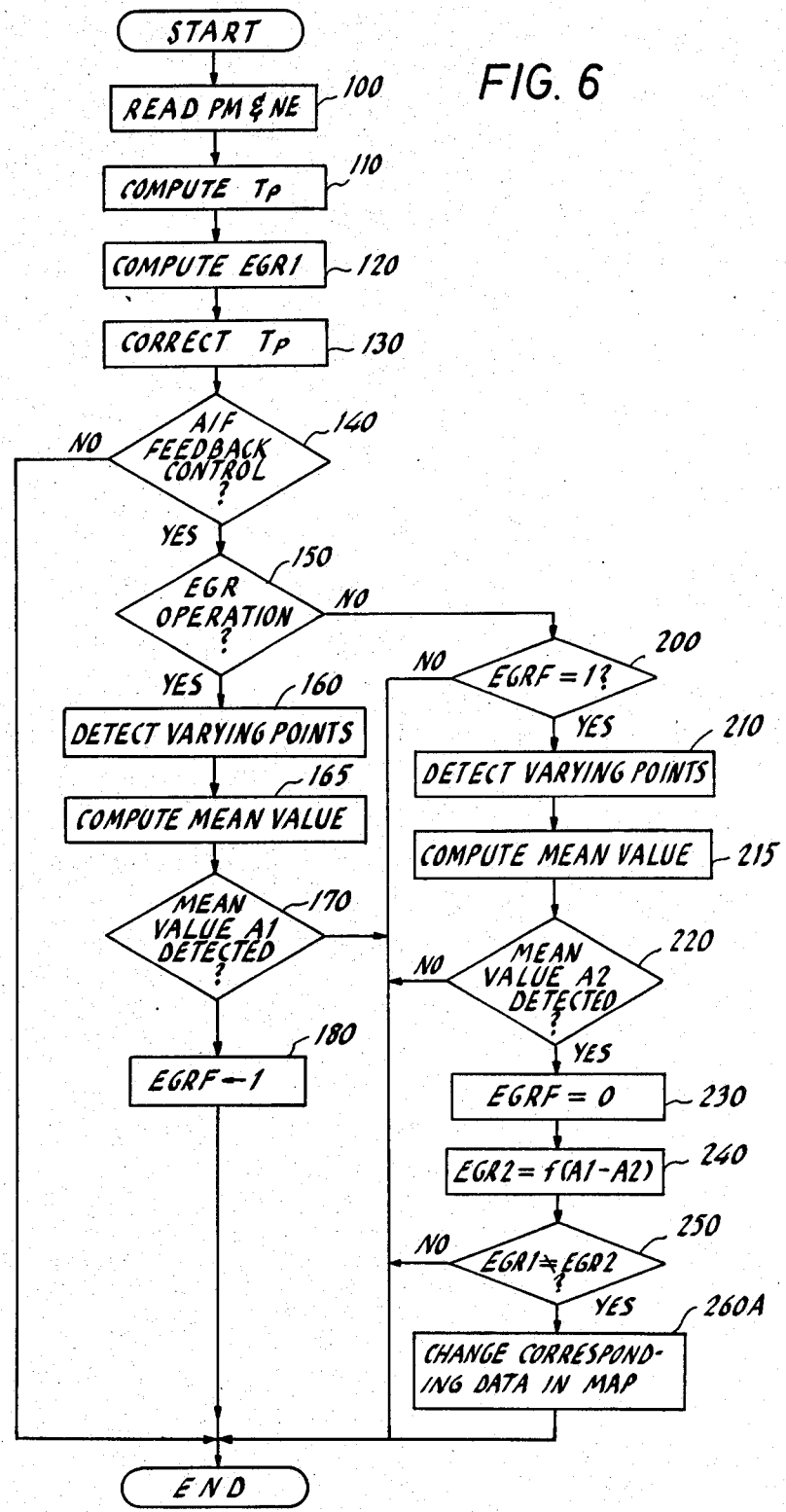
FIG. 6 is a flowchart showing another operational program of the microcomputer showing a third embodiment of the present invention.

Referring now to FIG. 6, a third embodiment of the present invention will be described. This embodiment differs from the first embodiment in that the steps 130 and 260 of FIG. 3 are respectively replaced with steps 130A and 260A. Although the amount of exhaust gasses to be recirculated is increased to compensate for secular change in the above-described first and second embodiments, the amount of fuel to be injected is increased by this third embodiment so as to obtain a desired air/fuel ratio. More specifically, while the fuel injection duration Tp obtained in the step 110 is corrected by shortening the same in the step 130 using a correction factor G stored in the memory of the microcomputer 52 in the form of a one-dimensional map MAP(EGR1), this correction factor G is corrected to compensate for the error due to the decrease in the amount of recirculated exhaust gasses. This map MAP(EGR1) includes a plurality of correction factor values G arranged in correspondence with values of EGR1 indicative of the amount of exhaust gasses to be recirculated. This is because the proportion of the exhaust gasses recirculated to the intake air sucked into the engine 10 can be computed using the value of EGR1. Using the correction factor G picked up from the map MAP(EGR1), the basic fuel injection duration Tp is reduced to decrease the amount of fuel to be injected.

After the execution of the step 130, steps 150 to 180 and steps 200 to 250 are executed in the same manner as in the first embodiment of FIG. 3. When it is determined that EGR1 is different from EGR2 in the step 250, then the step 260A is carried out to correct air/fuel ratio deviation caused by the difference between the target value EGR1 and the accurately estimated value EGR2. More specifially, the correction factor G used for correcting the basic fuel injection duration Tp is rewritten by rewriting corresponding data in a map using the accurately estimated value EGR2. This rewriting of the correction factor G is provided for compensating for the reduction in fuel amount to be injected due to the deviation of the target value EGR1 from the accurately estimated value EGR2. In other words, since the amount of recirculated exhaust gasses is apt to deviate from a desired target value EGR1 due to secular change as described in the above, the fuel injection duration is lengthened to supply a desired amount of fuel which is suitable for actually sucked fresh air so as to obtain a desired air/fuel ratio. As a result, the engine 10 can be operated under an air/fuel ratio which is initially desired.

When the step 260A is completed, all the processings in this routine of FIG. 6 are terminated. As will be understood from the above, the correction factor G of fuel injection duration is accurately obtained in the middle of EGR operation. Assuming that the effective cross-section of the EGR pipe 24 is reduced by 10 percent by secular change (adhesion of carbon), the amount of recirculated exhaust gasses is decreased by substantially 10 percent irrespective of the target value EGR1. Therefore, all data of the correction factor values G in the map may be uniformly changed using the data (EGR1−EGR2) indicative of the amount of reduction in the amount of recirculated exhaust gasses which data is obtained at given time.

As described in the above, since the fuel injection amount is corrected to obtain a desired air/fuel ratio using accurately estimated amount of recirculated exhaust gasses, the engine 10 is capable of operating under a desired state so as to exhibit high performance. More specifically, while air/fuel ratio feedback control is usually interrupted during engine-starting period, warming-up period or the like so that open loop control is effected in such engine operating states, the air/fuel ratio control provided by the above-described third embodiment is capable of accurately setting air/fuel ratio to a desired value even during such open loop control since the amount of reduction in the recirculated exhaust due to secular change is accurately detected.

Figure 7:
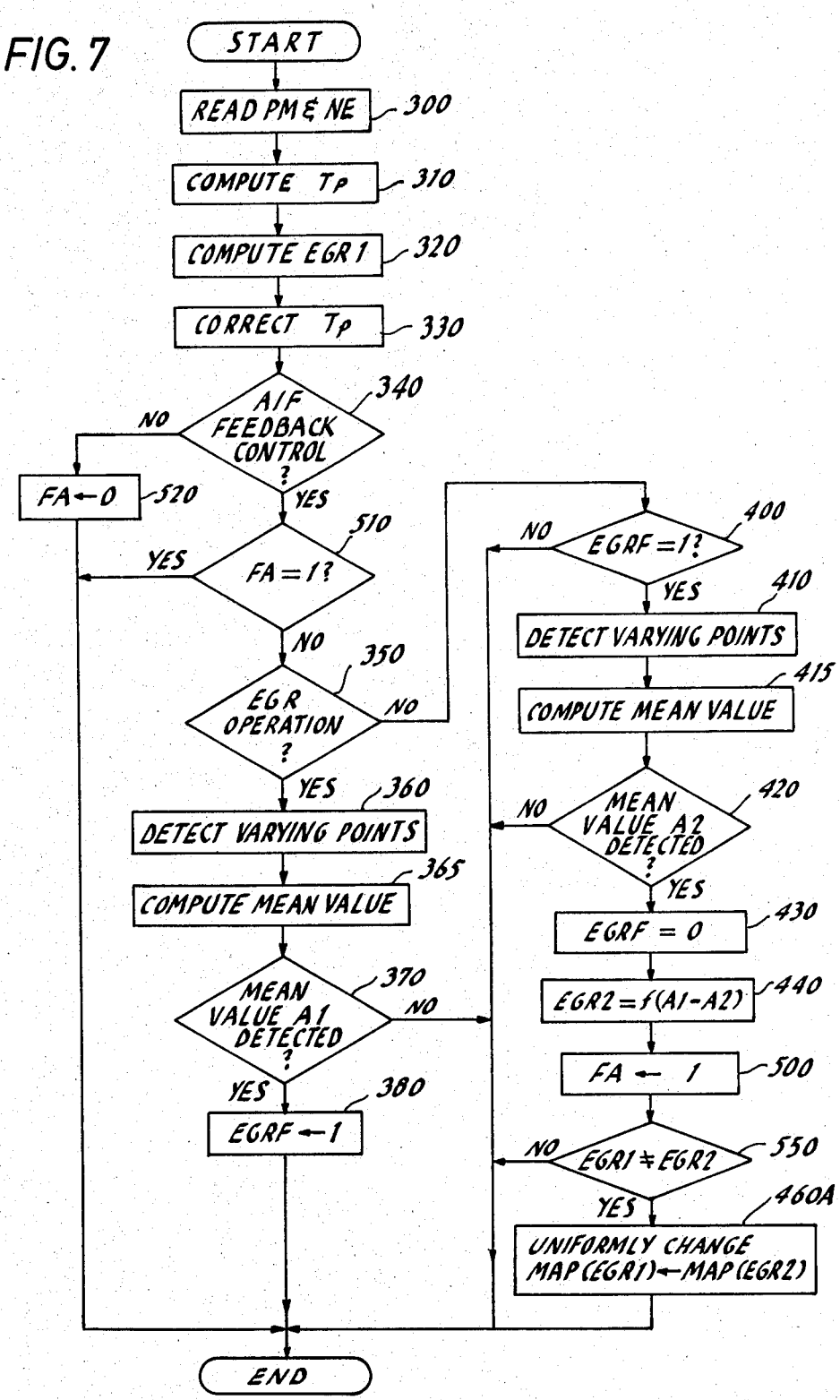
FIG. 7 is a flowchart showing another operational program of the microcomputer showing a fourth embodiment of the present invention.

Reference is now made to FIG. 7 showing a fourth embodiment of the present invention which is a modification of the above-described third embodiment of FIG. 6. The fourth embodiment differs from the third embodiment in that a flag FA, which has been described in connection with the second embodiment of FIG. 5, is used so as to compute EGR2 at limited occation in the same manner as in the second embodiment. Remaining program is substantially the same with the flowchart of FIG. 6, and description of steps in FIG. 7 is omitted for simplicity.

As described in the above, according to the present invention the amount of actually recirculated exhaust gasses through EGR system is accurately detected or computed using oxygen sensor output such that EGR is forcibly interrupted to find the difference between a variable, i.e. the correction factor Bn, derived from the oxygen sensor output resulted from engine operation with EGR and another variable derived from the oxygen sensor output resulted from engine operation without EGR. Using such accurately detected amount of EGR, which may deviate from the amount detected by the EGR valve lift sensor 22B, the amount of recirculated exhaust gasses can be accurately controlled irrespective of secular change of various parts forming the EGR system. Alternately, the amount of fuel supplied to the engien 10 can be accurately controlled so as to obtain a desired air/fuel ratio using the accurately detected amount of EGR.

The above-described embodiments are just examples of the present invention, and therefore, it will be apparent for those skilled in the art that many modifications and variations may be made without departing from the scope of the present invention.

What is claimed is:

1. Apparatus for controlling the amount of exhaust gases to be recirculated from an exhaust passage of an internal combustion engine to an intake passage of the same, comprising:
   (a) means for detecting various engine parameters;
   (b) gas sensor means for detecting the concentration of an exhaust gas in said exhaust passage;
   (c) means for forcibly interrupting exhaust gas recirculation when said engine is under air/fuel ratio feedback control and exhaust gas recirculation is being performed; and
   (d) computing means for computing a value representing a desired amount of exhaust to be recirculated using engine parameters and for:
      (1) producing a correction factor using an output signal from said gas sensor means;
      (2) obtaining a first mean value of a first plurality of feedback correction factor values during feedback control of air/fuel ratio and during exhaust gas recirculation control;
      (3) interrupting exhaust gas recirculation during air/fuel ratio feedback control;
      (4) obtaining a second mean value of a second plurality of feedback correction factor values when exhaust gas recirculation is being interrupted;
      (5) resuming exhaust gas recirculation when said second mean value is obtained;
      (6) detecting a difference between said first mean value and said second mean value; and
      (7) correcting said value using said difference.

2. A method of accurately estimating the amount of exhaust actually recirculated from an exhaust passage of an internal combustion engine to an intake passage of said engine equipped with air/fuel ratio feedback control apparatus, comprising the steps of:
   (a) deriving a first variable using an output signal from a gas sensor used for measuring concentration of a gas in said exhaust passage, when air/fuel ratio feedback control and exhaust gas recirculation are both being performed, said first variable being a mean value of a plurality of feedback correction factor values;
   (b) forcibly interrupting the exhaust gas recirculation;
   (c) deriving a second variable using the output signal from said gas sensor when air/fuel ratio feedback control is being performed but exhaust gas recirculation is interrupted, said second variable being a mean value of a plurality of feedback correction factor values;
   (d) resuming exhaust gas recirculation when said second variable is obtained;
   (e) calculating the difference between said first and second variables; and
   (f) obtaining the amount of exhaust gas recirculated using said difference.

3. A method of accurately estimating the amount of exhaust gases actually recirculated from an exhaust passage of an internal combustion engine to an intake passage of said engine equipped with air/fuel ratio feedback control apparatus, comprising the steps of:
   (a) deriving a first variable using an output signal from a gas sensor used for measuring a concentration of a gas in said exhaust passage, when air/fuel ratio feedback control and exhaust gas recirculation are both being performed, said first variable being a mean value of a plurality of feedback correction factor values, said step of deriving said first variable including:
      (1) detecting a plurality of values of said first variable when stepwisely changing;
      (2) computing a mean value of said plurality of values;
      (3) cancelling at least one value which is deviated from said mean value by a predetermined amount; and
      (4) finally obtaining a mean value of said plurality of values, which plurality equals a predetermined value;
   (b) forcibly interrputing the exhaust gas recirculation;
   (c) deriving a second variable using the output signal from said gas sensor when air/fuel ratio feedback control is being performed but exhaust gas recirculation is interrupted, said second variable being a mean value of a plurality of feedback correction factor values, said step of deriving said first variable including:
      (1) detecting a plurality of values of said second variable when stepwisely changing;

(2) computing a mean value of said plurality of values;

(3) cancelling at least one value which is deviated from said mean value by a predetermined amount; and (4) finally obtaining a mean value of said plurality of values, which plurality equals a predetermined value;

(d) resuming exhaust gas recirculation when said second variable is obtained;

(e) calculating the difference between said first and second variables; and (f) obtaining the amount of exhaust gas recirculated using said difference.

4. Apparatus for controlling air-fuel mixture to be supplied to an internal combustion engine having an intake passage, an exhaust passage, and an exhaust gas recirculation passage for recirculating exhaust gases in said exhaust passage to said intake passage therethrough, said apparatus comprising:

(a) means for detecting intake and rotational conditions of said engine;

(b) means for controlling an amount of fuel to be supplied to said engine along with air for combustion therein in accordance with said detected intake and rotational conditions;

(c) means for detecting an exhaust composition in said exhaust passage;

(d) means for determining a correction factor using the detected exhaust composition when said engine is under a predetermined feedback control;

(e) means for correcting said amount of fuel using said correction factor;

(f) means for controlling an amount of exhaust to be recirculated through said recirculation passage in accordance with said detected intake and rotational conditions;

(g) means for detecting a difference between a first correction factor value detected when the operation of said recirculation control means is enabled, and a second correction factor value detected when the operation of said recirculation control means is disabled during a period where said engine is in said predetermined feedback control condition, the difference detecting means including:

(1) first averaging means for averaging a first plurality of said correction factor values detected when an output signal from said exhaust composition detecting means stepwisely changes during a period where the operation of said recirculation control means is enabled;

(2) second averaging means for averaging a second plurality of correction factor values detected when said output signal from said exhaust composition detecting means stepwisely changes during a period where the operation of said recirculation control means is disabled; and (3) subtracting means for subtracting a second mean value obtained by said second averaging means from a first mean value obtained by said first averaging means;

(h) means for enabling the operation of said first averaging means each time the operation of said recirculation control means is enabled;

(i) means for disabling the operation of said recirculation control means each time said first correction factor values are averaged by said first averaging means; and (j) means for correcting said air-fuel mixture in accordance with said detected difference between correction factor values, the mixture correcting means having recirculation correcting means for correcting said amount of recirculated exhaust in accordance with the detected difference.

5. Apparatus for controlling an air-fuel mixture to be supplied to an internal combustion engine having an intake passage, an exhaust passage, and an exhaust gas recirculation passage for recirculating exhaust gases in said exhaust passage to said intake passage therethrough, said apparatus comprising:

(a) means for detecting intake and rotational conditions of said engine;

(b) means for controlling an amount of fuel to be supplied to said engine with air for combustion therein in accordance with said detected intake and rotational conditions;

(c) means for detecting exhaust composition in said exhaust passage;

(d) means for correcting said amount of fuel by a correction factor determined by the detected exhaust composition when said engine is under a predetermined feedback control;

(e) means for controlling an amount of exhaust to be recirculated through said recirculation passage in accordance with said detected intake and rotational conditions;

(f) means for detecting a difference between correction factor values respectively detected when the operation of said recirculation control means is enabled and disabled during a period when said engine is in said predetermined feedback control condition, the difference detecting means having:

(1) first averaging means for averaging a first plurality of correction factor values detected when an output signal from said exhaust composition detecting means stepwisely changes during a period where the operation of said recirculation control means is enabled;

(2) second averaging means for averaging a second plurality of correction factor values detected when said output signal from said exhaust composition detecting means stepwisely changes during a period where the operation of said recirculation control means is disabled; and (3) subtracting means for subtracting a mean value obtained by said second averaging means from another mean value obtained by said first averaging means;

(g) means for enabling the operation of said first averaging means each time said engine is under said predetermined feedback control;

(h) means for disabling the operation of said recirculation control means each time said first correction factor values are averaged by said first averaging means; and (i) means for correcting said air-fuel mixture in accordance with said detected difference between correction factor values, said mixture correcting means having recirculation correcting means for correcting said amount of recirculated exhaust in accordance with the detected difference.

6. Apparatus for controlling an air-fuel mixture to be supplied to an internal combustion engine having an intake passage, an exhaust passage, and an exhaust gas recirculation passage for recirculating exhaust gases in said exhaust passage to said intake passage therethrough, said apparatus comprising:
- (a) means for detecting intake and rotational conditions of said engine;
- (b) means for controlling an amount of fuel to be supplied to said engine with air for combustion therein in accordance with said detected intake and rotational conditions;
- (c) means for detecting an exhaust composition in said exhaust passage;
- (d) means for correcting said amount of fuel by a correction factor determined by the detected exhaust composition when said engine is under a predetermined feedback control;
- (e) means for controlling an amount of exhaust to be recirculated through said recirculation passage in accordance with said detected intake and rotational conditions;
- (f) means for detecting a difference between correction factor values respectively detected when the operation of said recirculation control means is enabled and disabled during a period where said engine is in said predetermined feedback control condition, the difference detecting means having:
  - (1) first averaging means for averaging a first plurality of correction factor values detected when an output signal from said exhaust composition detecting means stepwisely changes during a period where the operation of said recirculation control means is enabled;
  - (2) second averaging means for averaging a second plurality of correction factor values detected when said output signal from said exhaust composition detecting means stepwisely changes during a period where the operation of said recirculation control means is disabled; and
  - (3) subtracting means for subtracting a mean value obtained by said second averaging means from another mean value obtained by said first averaging means;
- (g) means for enabling the operation of said first averaging means each time the operation of said recirculation control means is enabled;
- (h) means for disabling the operation of said recirculation control means each time said first correction factor values are averaged by said first averaging means; and
- (i) means for correcting said air-fuel mixture in accordance with said detected difference between correction factor values, the mixture correcting means having fuel correcting means for correcting the amount of fuel in accordance with the detected difference.

7. Apparatus for controlling air-fuel mixture to be supplied to an internal combustion engine having an intake passage, an exhaust passage, and an exhaust gas recirculation passage for recirculating exhaust gases in said exhaust passage to said intake passage therethrough, said apparatus comprising:
- (a) means for detecting intake and rotational conditions of said engine;
- (b) means for controlling an amount of fuel to be supplied to said engine with air for combustion therein in accordance with said detected intake and rotational conditions;
- (c) means for detecting exhaust composition in said exhaust passage;
- (d) means for correcting said amount of fuel by a correction factor determined by the detected exhaust composition when said engine is under a predetermined feedback control;
- (e) means for controlling an amount of exhaust to be recirculated through said recirculation passage in accordance with said detected intake and rotational conditions;
- (f) means for detecting a difference between correction factor values respectively detected when the operation of said recirculation control means is enabled and disabled during a period where said engine is in said predetermined feedback control condition, the difference detecting means having:
  - (1) first averaging means for averaging a first plurality of correction factor values detected when an output signal from said exhaust composition detecting means stepwisely changes during a period where the operation of said recirculation control means is enabled;
  - (2) second averaging means for averaging a second plurality of correction factor values detected when said output signal from said exhaust composition detecting means stepwisely changes during a period where the operation of said recirculation control means is disabled; and
  - (3) subtracting means for subtracting a mean value obtained by said second averaging means from another mean value obtained by said first averaging means;
- (g) means for enabling the operation of said first averaging means each time said engine is under said predetermined feedback control;
- (h) means for disabling the operation of said recirculation control means each time said first correction factor values are averaged by said first averaging means; and
- (i) means for correcting said air-fuel mixture in accordance with said detected difference between correction factor values, the mixture correcting means having fuel correcting means for correcting the amount of fuel in accordance with the detected difference.

8. An apparatus for accurately estimating the amount of exhaust gases actually recirculated from an exhaust passage of an internal combustion engine to an intake passage of said engine equipped with air/fuel ratio feedback control apparatus, comprising:
- (a) first means for deriving a first variable using an output signal from a gas sensor used for measuring a concentration of a gas in said exhaust passage, when air/fuel ratio feedback control and exhaust gas recirculation are both being performed, said first variable being a mean value of a plurality of feedback correction factor values, said first deriving means also for:
  - (1) detecting a plurality of values of said first variable when stepwisely changing;
  - (2) computing a mean value of said plurality of values;
  - (3) cancelling at least one value which is deviated from said mean value by a predetermined amount; and
  - (4) finally obtaining a mean value of said plurality of values, which plurality equals a predetermined value;
- (b) means for forcibly interrupting the exhaust gas recirculation;

(c) second means for deriving a second variable using the output signal from said gas sensor when air/fuel ratio feedback control is being performed but exhaust gas recirculation is interrupted, said second variable being a mean value of a plurality of feedback correction factor values, said second deriving means also for:
   (1) detecting a plurality of values of said second variable when stepwisely changing;
   (2) computing a mean value of said plurality of values;
   (3) cancelling at least one value which is deviated from said mean value by a predetermined amount; and
   (4) finally obtaining a mean value of said plurality of values whose number equals a predetermined value;
(d) means for resuming exhaust gas recirculation when said second variable is obtained;
(e) means for calculating the difference between said first and second variables; and
(f) means for obtaining the amount of exhaust gas recirculated using said difference.

9. Apparatus for controlling air-fuel mixture to be supplied to an internal combustion engine having an intake passage, an exhaust passage, and an exhaust gas recirculation passage for recirculating exhaust gases in said exhaust passage to said intake passage therethrough, said apparatus comprising:
   (a) means for detecting intake and rotational conditions of said engine;
   (b) means for controlling an amount of fuel to be supplied to said engine with air for combustion therein in accordance with said detected intake and rotational conditions;
   (c) means for detecting an exhaust composition of said exhaust gas in said exhaust passage;
   (d) means for determining a correction factor which is determined from detected exhaust composition when said engine is under a predetermined feedback control;
   (e) means for correcting said amount of fuel using said correction factor;
   (f) means for controlling an amount of exhaust to be recirculated through said recirculation passage in accordance with said detected intake and rotational conditions;
   (g) first averaging means for obtaining a first mean value of a first plurality of said correction factor values during feedback control of air/fuel ratio and during exhaust gas recirculation control;
   (h) means for prohibiting exhaust gas recirculation during air/fuel ratio feedback control;
   (i) second averaging means for obtaining a second mean value of a second plurality of said correction factor values when exhaust gas recirculation is being prohibited;
   (j) means for resuming exhaust gas recirculation when said mean value of said second feedback correction factor values is obtained;
   (k) means for determining a difference between said mean value of said first feedback correction factor values and said means value of said second feedback correction factor values; and
   (l) means for correcting said air-fuel mixture in accordance with said detected difference between said first and second correction factor values.

10. Apparatus as claimed in claim 9, wherein said first averaging means is also for obtaining said first mean value when an output signal from said exhaust composition detecting means stepwisely changes during a period where the operation of said recirculation control means is enabled; and
   said second averaging means is also for obtaining said second mean value when said output signal from said exhaust composition detecting means stepwisely changes during a period where the operation of said recirculation control means is disabled;
   the difference detecting means including subtracting means for subtracting said second mean value obtained by said second averaging means from said first mean value obtained by said first averaging means.

11. Apparatus as claimed in claim 9, wherein said mixture correcting means (1) comprises recirculation correcting means for correcting said amount of recirculated exhaust in accordance with the detected difference.

12. Apparatus as claimed in claim 1, wherein said first averaging means is also for obtaining said first mean value when an output signal from said exhaust composition detecting means stepwisely changes during a period where the operation of said recirculation control means is enabled; and
   said second averaging means is also for obtaining said second mean value when said output signal from said exhaust composition detecting means stepwisely changes during a period where the operation of said recirculation control means is disabled;
   the difference detecting means including subtracting means for subtracting said second mean value obtained by said second averaging means from said first mean value obtained by said first averaging means.

* * * * *